June 26, 1923.

J. W. BLAIR 1,460,224

PIPE REPAIR CLAMP

Filed Oct. 7, 1920

WITNESSES

INVENTOR
J. W. BLAIR
BY
ATTORNEYS

Patented June 26, 1923.

1,460,224

UNITED STATES PATENT OFFICE.

JEAN WRIGHT BLAIR, OF NEW YORK, N. Y.

PIPE-REPAIR CLAMP.

Application filed October 7, 1920. Serial No. 415,330.

*To all whom it may concern:*

Be it known that I, JEAN W. BLAIR, a citizen of the United States, and resident of the city of New York, borough of Manhattan, county of New York, and State of New York, have invented a new and Improved Pipe-Repair Clamp, of which the following is a full, clear, and exact description.

In connection with pipe repair clamps, it is a well appreciated fact that numerous devices have been placed upon the market, including a clamping structure adapted to embrace a pipe and to retain in applied position thereon, a patch covering the rupture or opening from which the escape of fluid was to be prevented.

My invention aims to provide a device of this nature, and more particularly to provide a certain improved construction over U. S. Patent No. 389,102, to W. J. Purdy, dated September 4, 1888.

In connection with repair clamps of the type included in the above identified patent, it is well appreciated that considerable difficulty has been experienced in connection with their application, and more particularly where a device is to be applied to one of a nest of closely spaced pipes, such as is found in a boiler, refrigerating plant, etc.

This is true, in view of the fact that the straps or side portions of the U shaped member forming the body of the device must be of sufficient length to extend around and beyond a pipe, and permit the association of a clamping member therewith.

Obviously, where one pipe is to have a repair clamp associated therewith, and forms one of a nest of pipes, the next adjacent pipe will contact with the U shaped or body portion of the clamp, and render it exceedingly difficult to move the latter to its applied position.

With this in view, I have provided a pipe repair clamp, which more particularly aims to provide an improved structure over the prior patent above identified, and by means of which it will be possible to associate the body portion of the clamp with one of a nest of pipes irrespective of the proximity of the next adjacent pipe.

Reference is had to the attached sheet of drawings as illustrating one practical embodiment of my invention, and in which drawings—

Figure 1:
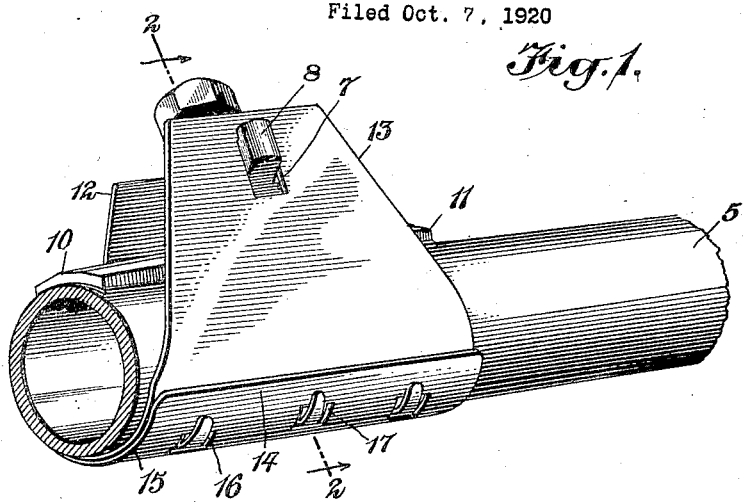
Figure 1 is a perspective view of a repair clamp applied to a conduit or pipe.

In these views the reference numeral 5 indicates a pipe or conduit, in which a puncture has occurred, or other opening 6 has been formed, which opening is to be covered so that the escape of any fluid from within the pipe or conduit is prevented.

Figure 2:
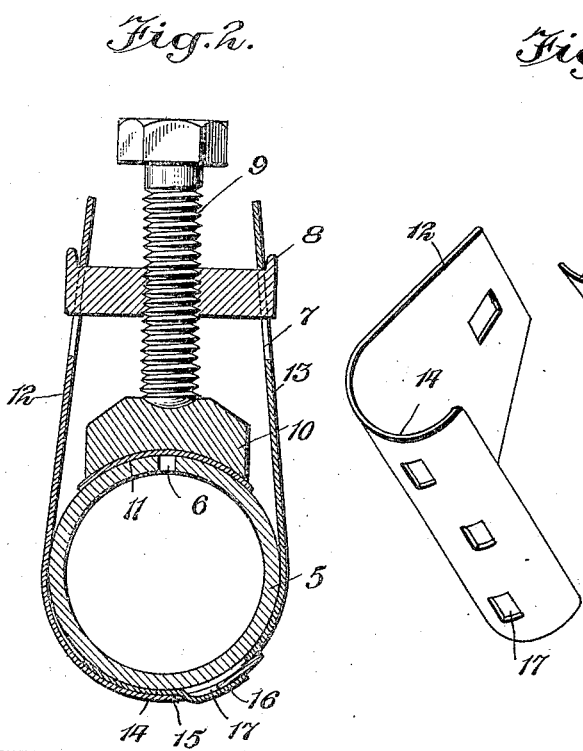
Figure 2 is an enlarged sectional side view taken along the line 2—2 of Figure 1.
Figure 3:
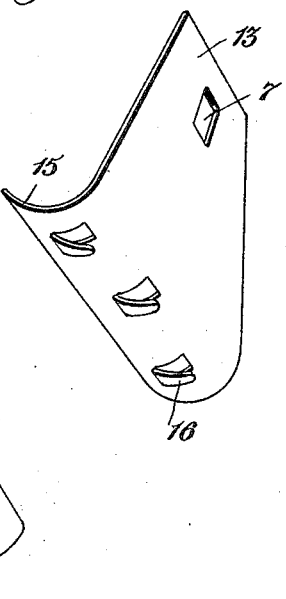
Figure 3 is a perspective view of the parts forming the body portion of the clamp, and showing the latter disassembled.

Referring now more particularly to the structure illustrated in Figure 2, it will be seen that my pipe repair clamp conveniently includes a body portion, which is preferably U shaped in cross section, and adjacent the upper ends of which a pair of openings 7 is formed. These openings may be engaged by a bridge piece 8 formed with a screw threaded opening communicating with a screw threaded rod 9, bearing with its inner end against a shoe 10, and retaining a patch 11 in applied position to the opening 6.

This construction is entirely conventional, and may be subjected to any number of variations according to the needs of the clamp being constructed.

Contrary to the conventional construction, however, the body portion of the device is preferably in two sections, each of which preferably includes a straight body portion 12 and 13 respectively, the lower ends of these body portions being curved, and upturned as has been indicated by the reference numerals 14 and 15 respectively, the curve of each conforming to that of the other, and to the exterior diameter of the pipe 5, or other member to which the clamp is to be applied.

Also contrary to the conventional construction, these curved portions are conveniently provided with interengaging means permitting of their ready detachment and attachment, one from the other, together with a slight swinging motion of these parts while secured together, thus forming what might be termed a separable hinged joint.

It will be understood, in practice, that contrary to the conventional method of inserting the body portion of the device in one solid piece, in such a manner that one of the outer edges of the same clears the pipe to which the patch is to be applied, and subsequently pulling the body portion to a point at which it snugly fits the pipe, with my improved clamp the body portions of the device are inserted from opposite sides of the pipe, and by virtue of the separable engagement afforded to the curved portions 14 and 15 of the body member of the clamp, by means of the tongues 16 of one curved portion engaging the opening 17 of the other, that these parts may be brought into engagement one with the other to form the completed body member of the clamp. In this connection it is to be noted that the openings and tongues are arranged in staggered relationship so as to preclude any accidental detachment.

Subsequent to this, by virtue of the hinged connection permitted, the outer ends of the body portion may be spread to permit of the adaption of the bridge piece 8, or other suitable structure employed for securing the patch in applied position.

Obviously by means of this construction it will not be necessary to insert the body portion of the patch to a distance beyond the thickness of the members forming the curved portions 14 and 15, so that the defects noted in the beginning of the specification are avoided.

Further, obviously numerous modifications of structure might readily be resorted to without in the least departing from the spirit of my invention, which I claim as follows—

1. A pipe repair clamp including a body portion comprising a plurality of sections, means adapted to cooperate with said sections adjacent their upper ends for retaining the same in applied position, one of said sections being formed with openings adjacent its lower end, said openings being arranged in a longitudinal series across the width of the section last mentioned, the second of said sections being formed with tongues arranged in a longitudinal series across the width of the section last mentioned and adjacent its lower end, said tongues extending outwardly and towards the upper end of said section.

2. A pipe repair clamp including a body portion comprising a plurality of sections, means adapted to co-operate with said sections adjacent their upper ends for retaining the same in applied position, one of said sections being formed with openings adjacent its lower end, said openings being arranged in staggered relationship, the second of said sections being formed with tongues adjacent its lower end, said tongues extending outwardly and towards the upper end of said section, and being also arranged in staggered relationship.

JEAN WRIGHT BLAIR.